(12) United States Patent
Herbener et al.

(10) Patent No.: US 7,825,541 B2
(45) Date of Patent: Nov. 2, 2010

(54) METHOD OF CONTROLLING A PLURALITY OF UPS UNITS IN AN ON-LINE UPS SYSTEM AND ON-LINE UPS SYSTEM HAVING A PLURALITY OF UPS UNITS

(75) Inventors: Frank Herbener, Bad Grund (DE); Orleff Poeschel, Osterode (DE)

(73) Assignee: Piller Group GmbH, Osterode Am Harz (DE)

( * ) Notice: Subject to any disclaimer, the term of this patent is extended or adjusted under 35 U.S.C. 154(b) by 251 days.

(21) Appl. No.: 12/112,479

(22) Filed: Apr. 30, 2008

(65) Prior Publication Data

US 2008/0309166 A1  Dec. 18, 2008

(30) Foreign Application Priority Data

May 3, 2007  (DE)  ........................ 10 2007 021 089

(51) Int. Cl.
*H02J 9/00* (2006.01)
(52) U.S. Cl. ........................................ 307/64
(58) Field of Classification Search ................... 307/64, 307/66
See application file for complete search history.

(56) References Cited

U.S. PATENT DOCUMENTS

| | | | |
|---|---|---|---|
| 4,983,856 A * | 1/1991 | Pelletier | 307/20 |
| 5,596,492 A | 1/1997 | Divan et al. | |
| 6,023,152 A | 2/2000 | Briest et al. | |
| 6,177,738 B1 * | 1/2001 | Hentunen et al. | 307/67 |
| 7,072,195 B2 | 7/2006 | Xu | |
| 7,459,803 B2 * | 12/2008 | Mosman | 307/64 |
| 2001/0009338 A1 | 7/2001 | Reutere | |

FOREIGN PATENT DOCUMENTS

| | | |
|---|---|---|
| DE | 197 15 468 C1 | 10/1998 |
| DE | 100 02 583 A1 | 8/2001 |
| WO | 2008-017014 A2 | 2/2008 |

* cited by examiner

*Primary Examiner*—Michael Rutland Wallis
(74) *Attorney, Agent, or Firm*—Thomas, Kayden, Horstemeyer & Risley, LLP

(57) ABSTRACT

Parallel-connected UPS units of an online UPS system, which are each connected on the input side via a choke coil to an AC mains, in disconnectable fashion, and on the output side to a common load bus and whose supplied powers are individually variable, are disconnected from the AC mains in the event of a failure of the AC mains, at least if they are affected by the failure, and are successively reconnected to the AC mains after the restoration of the AC mains. In this case, in order to match the powers supplied by the individual UPS units to one another, while some of the UPS units are connected on the input side to the AC mains and others of the UPS units are not connected on the input side to the AC mains, a phase angle $\Delta\phi$ between the AC mains and the load bus is determined, and the power supplied by each of the UPS units which have not yet been reconnected to the AC mains is adjusted as a function of this phase angle $\Delta\phi$.

12 Claims, 1 Drawing Sheet

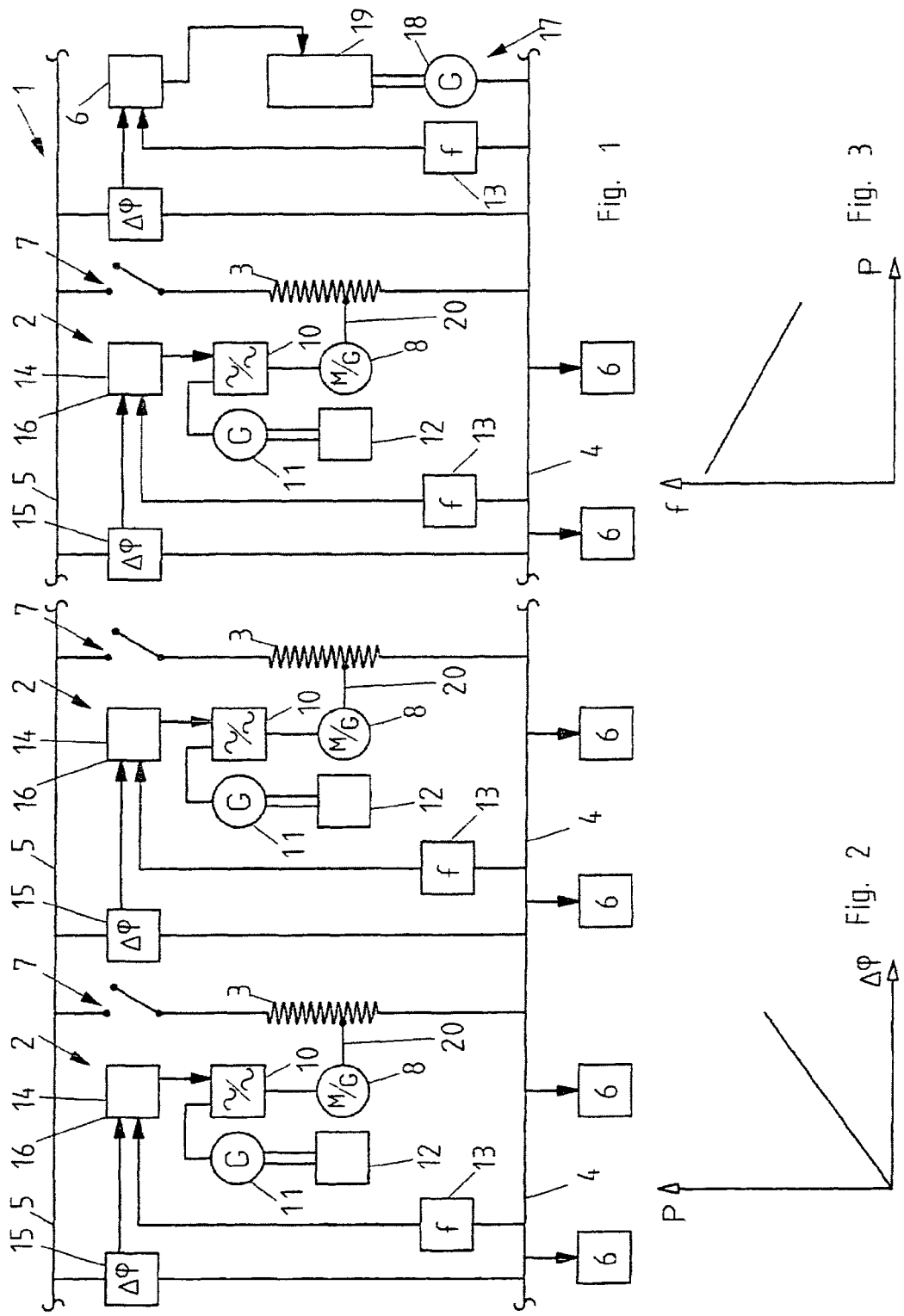

METHOD OF CONTROLLING A PLURALITY OF UPS UNITS IN AN ON-LINE UPS SYSTEM AND ON-LINE UPS SYSTEM HAVING A PLURALITY OF UPS UNITS

CROSS-REFERENCING WITH RELATED APPLICATIONS

This application claims the priority of co-pending German patent application DE 10 2007 021 089.4 entitled "Verfahren zur Steuerung Parallel geschalteter Ersatzstromquellen und Vorrichtung mit parallel geschalteteten Ersatzstromquellen" filed on May 3, 2007.

FIELD OF THE INVENTION

The invention relates to a method of controlling the power of a plurality of parallel-connected UPS units of an online UPS system. In particular, the invention relates to a method of controlling the power of the UPS units which have not yet been reconnected to an AC mains during operation of an online UPS system in the mixed mode, in which at least one but not yet all of the UPS units have been reconnected on the input side to the AC mains.

Furthermore, the invention relates to an online UPS system, which is designed and intended especially for implementing a method of the invention.

BACKGROUND OF THE INVENTION

In this description, the term UPS unit is used synonymously with the likewise used term backup power source.

There is a wide variety of backup power sources which can be used in the present invention. These may be ones in which an electrical machine is provided which has two windings, one of which is connected to a tap of a choke coil between an AC mains and a load bus. Such a backup power source is also regarded here as being connected on the input side to the AC mains and on the output side to the load bus. In the case of parallel running during mains operation of the load bus, the electrical machine brings about an improvement in the current quality by mains fluctuations and distortions of the alternating current provided by the AC mains being averaged out. For the short-term backup supply of the load bus, alternating current is applied to the other winding of the electrical machine via an inverter, the electrical power originating from a generator which is driven by a flywheel. For this purpose, the flywheel has previously, i.e. during the mains operation, been charged with kinetic energy, with the generator having been used as a motor. For longer-term backup supply of the load bus, an additional motor, for example a diesel motor, can be provided which can mechanically drive the rotor of the electrical machine directly.

U.S. Pat. No. 6,023,152 A has disclosed a system for stabilizing a power supply system which can also be used as one of a plurality of parallel-connected backup power sources in an online UPS system of the invention. US 2001/0009338 A1 also describes an apparatus for uninterruptible power supply which can be used as one of a plurality of parallel-connected backup power sources in an online UPS system of the invention.

However, the present invention is not concerned with the precise design of the backup power source.

There are also possible variants as regards the connection of the backup power sources to the load bus.

For example, the backup power sources, as in the described case of the electrical machine which is connected to the tap of a choke coil which is split in this way, can also be connected to the load bus via a choke coil. However, a choke coil is only essential between each backup power source and the AC mains. Loads to be supplied can be connected directly to the load bus or else to any point between a backup power source and the load bus.

In order to ensure the supply of the electrical loads connected to a load bus in the event of failure of an AC mains, a single backup power source with correspondingly large dimensions can be provided, or a plurality of parallel-connected backup power sources can supply the load bus with the required electrical power. In this case, the latter option is generally preferred because it is possible to use standardized backup power sources which only need to be matched to the respective application case in terms of their number. If the power requirement for the load bus is fundamentally increased, additional backup power sources can also be provided retrospectively. Moreover, the failure of an individual one of these backup power sources is usually unproblematic. Restarting of the mains operation is also simpler in the case of a plurality of parallel-connected backup power sources because the AC mains does not need to take over the full power again immediately, but the individual supply paths from the AC mains to the load bus on which the individual backup power sources are arranged can be switched over from the backup power source supply to the mains supply successively. In the case of the use of a plurality of parallel-connected backup Dower sources, however, it is necessary to ensure that they are subjected to as uniform a load as possible, i.e. that they cover the power requirement of the load bus in proportions which are as equal as possible. In this case, it is in principle conceivable for a superordinate controller to determine the overall power requirement and to distribute it among the individual backup power sources. However, this concept goes against a modular design of the overall apparatus.

In the case of a droop method, it is known, for the purpose of matching the powers supplied by individual backup power sources, if these are all disconnected from the AC mains, to determine in each backup power source a desired value for the frequency of the alternating current provided jointly by all backup power sources on the load bus from a characteristic which falls with the power supplied at that time by the respective AC source. The actually measured frequency of the alternating current on the load bus is compared as an actual value with this desired value. If the desired value for the frequency which is determined for the respective backup power source is above the measured actual value on the load bus, the power supplied by the backup power source to the load bus is increased by virtue of the attempt by the backup power source to increase the actual value for the frequency to the desired value. The increase in power of the respective AC source which is associated with the attempt to increase the frequency results in a reduction in the desired value for the frequency owing to the falling frequency/power characteristic. In this way, an individual backup power source is matched from below to a power required by the load bus. Correspondingly, a backup power source which at the outset had supplied more than an average power to the load bus is brought close to the required power from above. Given the same backup power source and the same characteristics, all of the backup power sources thus adjusted to the same power. If, in the process, the actual value for the frequency of the alternating current on the load bus changes as a result of increasing or falling powers of the individual backup power sources or different loads on the load bus, this corresponds to an altered power which is required by the load bus and to which the powers of all backup power sources are automatically matched. Advantageously, no communication between the individual backup power sources is necessary in order for their powers to be matched. Dedicated devices for determining the frequency of the alternating current on the load bus can be associated with each backup power source, and the dedicated present power is generally in any case present in each backup power source. This known procedure cannot be applied, however, for regulating the powers of the backup power sources which have not yet been reconnected on the input side to the AC mains, while other backup power sources, which are connected on the output side to said AC mains via the load bus, have already been reconnected to the AC mains or were never disconnected from the AC mains owing to only partial failure thereof, with the result that the electrical power transmitted via the respective choke coil to the load bus is provided by the AC mains because, owing to the connection of the load bus to the AC mains, the frequency of the AC mains is imposed on the alternating current on the load bus. The frequency of the alternating current on the load bus is therefore not available as a manipulated variable for the adjustment of all backup power sources which are still in use.

A special droop method of controlling a plurality of parallel-connected backup power sources which are connected on the input side to an AC mains in disconnectable fashion and on the output side to a common load bus while all of the backup power sources are disconnected from the mains is known from U.S. Pat. No. 7,072,195 B2. In addition to apparatuses in which a plurality of parallel-connected backup power sources are connected on the input side to an AC mains, in each case in disconnectable fashion, and on the output side to a common load bus, which are referred to as online UPS systems, U.S. Pat. No. 7,072,195 B2 also discloses apparatuses in which, instead of the connection of the backup power sources to the AC mains on the input side, the AC mains is connected to the load bus in directly disconnectable fashion and which are referred to as line-interactive UPS systems. In addition, the reconnection of the AC mains to the load bus is described for such a line-interactive UPS system. For this purpose, a phase angle between the AC mains and the load bus is reduced as far as possible to zero before the reconnection of the AC mains to the load bus. U.S. Pat. No. 7,072,195 B2 is not concerned with mixed operation of an online UPS system during the successive reconnection of the individual backup power sources, which on the input side are first disconnected from the AC mains and on the output side are connected to the common load bus, to the AC mains.

U.S. Pat. No. 5,596,492 A also describes a droop method of matching the powers supplied by the individual backup power sources to one another in a line-interactive UPS system, while the load bus is disconnected from the AC mains. In this case, the droop characteristic is displaced in all backup power sources in order to maintain a certain frequency of the alternating current on the load bus. This displacement is also used for matching the frequency of the alternating current on the load bus during the reconnection of the load bus to the AC mains to the frequency of the AC mains in such a way that the power supply of the load bus is transferred to the AC mains in a controlled manner, i.e. whilst reducing the power of the backup power sources. U.S. Pat. No. 5,596,492 does not relate to an online UPS system in which the individual backup power sources are connected on the input side to the AC mains in disconnectable fashion, and in particular does not relate to mixed operation of such an online UPS system when the individual backup power sources are reconnected to the AC mains after the restoration of the AC mains.

There is a requirement for control which makes it possible to independently adjust the powers of the individual backup power sources, which have not yet been reconnected to the AC mains, in order to subject them to a uniform load, during operation of an online UPS system in the mixed mode during successive reconnection of the backup power sources to the AC mains.

SUMMARY OF THE INVENTION

The present invention relates to a method of controlling a plurality of parallel-connected UPS units of a UPS system, each of the UPS units being connected on the input side via a choke coil to an AC mains, in disconnectable fashion, and on the output side to a common load bus, and the power supplied by each individual UPS unit being variable, the method comprising the steps of: in the event of a failure of the AC mains: disconnecting at least the UPS units affected by the failure from the AC mains; after the restoration of the AC mains: successively reconnecting the UPS units to the AC mains; and while a first group of the UPS units is connected on the input side to the AC mains and a second group of the UPS units is not connected on the input side to the AC mains: determining a phase angle $\Delta\phi$ between an alternating current of the AC mains and an alternating current on the load bus and adjusting the power supplied by each of the UPS units in the second group as a function of the phase angle $\Delta\phi$ in order to match the powers supplied by the individual UPS units in the second group to one another.

Furthermore, the present invention relates to an online UPS system having a plurality of parallel-connected UPS units, the UPS units each being connected on the input side via a choke coil to an AC mains, in disconnectable fashion, and on the output side to a common load bus, and the power supplied by each individual UPS unit being variable, and a controller, which comprises at least one device for determining a phase angle $\Delta\phi$ between an alternating current of the AC mains and an alternating current on the load bus and which in the event of a failure of the AC mains, disconnects at least the UPS units affected by the failure from the AC mains; after the restoration of the AC mains, successively reconnects the UPS units to the AC mains; and while a first group of the UPS units is connected on the input side to the AC mains and a second group of the UPS units is not connected on the input side to the AC mains, adjusts the power supplied by each of the UPS units in the second group as a function of the phase angle $\Delta\phi$ in order to match the powers supplied by the individual UPS units in the second group to one another.

In the novel method, a phase angle between the AC mains and the load bus, which arises when the load bus is also only connected to the AC mains via a choke coil of a backup power source, is determined; and this phase angle is used for matching the powers supplied by the individual backup power sources to one another, while some of the backup power sources, which are connected in parallel on the output side, are connected on the input side to the mains and others of the backup power sources are not connected to the mains. For this purpose, the power supplied by each of the backup power sources which have not yet been reconnected to the AC mains is adjusted individually as a function of the phase angle. The phase angle between the AC mains and the load bus is a measure of the power which is transmitted to the load bus via each of the choke coils, via which alternating current from the AC mains is already flowing again. Specifically, the phase angle is proportional to the power transmitted to the load bus via each of the choke coils from the AC mains; and with the knowledge of the phase angle this power itself is also known. By virtue of the fact that now each of the backup power sources is adjusted in such a way that it likewise emits this power; all of the backup power sources which on the input side have not yet been reconnected to the AC mains via their choke coil, are adjusted to an identical power. If, in the process, the phase angle is reduced because the power provided overall on the load bus by the backup power sources is so high that only a low power is now transmitted to the load bus via each choke coil which has been reconnected to the AC mains, this is reduced to the power required by the individual backup power supplies. There is therefore a complete control loop, which means that all of the backup power sources are subjected to the same load as the choke coils which have already been reconnected to the AC mains.

In this case, the novel method can be implemented for the individual backup power sources entirely independently of one another. For this purpose, the phase angle between the AC mains and the load bus can be determined separately for each backup power source which has not yet been reconnected to the AC mains, although this phase angle is the same for all backup power sources, in order to keep the backup power sources entirely independent of one another. In principle, it is naturally also possible to determine this phase angle centrally and to make it available to all backup power sources.

If the AC mains is branched upstream of the inputs of the individual backup power sources or of the choke coils associated with them so that also only some of the branches of the AC mains may have failed or have been restored, it is favorable if a separate bus line runs between the backup power sources which is connected to the branches of the AC mains, for example via relays and resistors, on which branches alternating current is still flowing or is flowing again. This bus line then provides all the backup power sources with the phase of the alternating current of the AC mains which is required both for determining the phase angle for the power regulation according to the invention and for synchronizing the individual backup power sources with the AC mains. It is also possible to tap off a bus line, which makes available the phase of the alternating current to all the backup power sources, from a feed point, for example a medium-voltage field, which is connected upstream and is common to the backup power sources. The resistors and relays are therefore no longer required.

In the individual backup power sources which have not yet been reconnected to the AC mains, the power supplied by them to the load bus can be adjusted proportionally with respect to the phase angle. In this case, the proportionality factor used can be the same for all of the backup power sources. However this is not essential. It is also possible for, for example, differently designed or configured backup power sources to be involved to different extents in the supply of power to the load bus. In this case, too, the novel method can be used to involve all of the backup power sources to a uniform degree in the supply to the load bus so that they produce, for example, an in each case identical percentage proportion of their maximum power. In principle, it is also possible for the backup power sources to each provide less power to the load bus than is flowing through each choke coil which has already been reconnected to the AC mains. For this purpose, correspondingly matched control curves for the power as a function of the phase angle in the individual backup power sources then need to be stored. A person skilled in the art is aware of the fact that, when backup power sources of different powers are connected in parallel, on full load the same phase angle needs to be provided via the respective choke coils in order that the sum of the maximum powers of the individual backup power sources is obtained as the maximum power of the parallel circuit.

The phase angle between the AC mains and the load bus can additionally be used when the powers supplied by the individual backup power sources are matched to one another during the successive reconnection of the backup power sources to the AC mains in order to adjust the power supplied by at least one standby power supply unit connected to the load bus. Such a standby power supply unit in this case never needs to be provided for its own connection to the AC mains.

In the online UPS system of the present invention, which is also referred to as an apparatus here, the controller has at least one device for determining a phase angle between the AC mains and the load bus. As a function of this phase angle, the controller adjusts the power supplied by each of the backup power sources which have not yet been reconnected to the AC mains during the successive reconnection of the backup power sources to the AC mains for the purpose of matching the powers supplied by the individual backup power sources to one another.

Preferably, in this case the controller has a module for each backup power source, which module adjusts the power supplied by the AC source which has not yet been reconnected to the AC mains independently of the modules of other backup power sources, as a function of the phase angle.

Each of the modules can moreover have a dedicated device for determining the phase angle between the AC mains and the load bus.

A control curve for the power of the backup power source, which is dependent on the phase angle, is stored in each module. This control curve may be linearly dependent on the phase angle and therefore defined exclusively by a proportionality factor. However, it is also possible for more complex control curves to be provided. The control curves in the individual modules do not need to be identical. However, this is preferred if the backup power sources are designed to be identical, which is in principle favorable in order to have identical conditions in all of the parts of the novel apparatus.

It is particularly preferred if the modules of the individual backup power sources adjust the powers supplied by the backup power sources in all operating states of the apparatus independently of one another. For the adjustment of the powers of the backup power sources while none of them have yet been reconnected to the AC mains on the input side, it is possible to use the method described at the outset and known from the prior art, which method is based on the determination of the power required by the load bus from the resultant reduction in the frequency of the alternating current on the load bus. In a combination of this concept known per se with the present invention, the individual backup power sources can be operated entirely autonomously with respect to one another apart from the fact that they are successively reconnected to the AC mains, in externally predetermined fashion.

BRIEF DESCRIPTION OF THE DRAWINGS

The invention will be understood better taking into consideration the following drawings. The parts in the drawings are not necessarily reproduced true to scale, but it is merely a question of the principles of the present invention being illustrated clearly. Identical reference symbols denote identical parts in the various views in the drawings.

FIG. 1 shows a very schematized single-line circuit diagram of the novel apparatus with backup power sources connected in parallel between an AC mains and a load bus, FIG. 2 shows a control curve, which is dependent on a phase angle $\Delta\phi$, for the power of an individual backup power source of the apparatus shown in FIG. 1 during successive reconnection of the backup power sources to the AC mains; and FIG. 3 shows a characteristic, which is dependent on the present power P of an individual backup power source shown in FIG. 1, for a desired frequency $f_S$, which is used, together with an actual frequency for the alternating current on the load bus, for power regulation of the backup power source if the load bus is completely disconnected from the AC mains.

DETAILED DESCRIPTION

Now with more detailed reference to the drawings, FIG. 1 illustrates an apparatus or an online UPS system 1 having a plurality of backup power sources or UPS units 2, which are each connected on the input side to an AC mains 5 and on the output side to a load bus 4 via a tap 20 of a choke coil 3. The choke coils 3 which are split by the respective tap 20 are arranged substantially between the backup power sources 2 and the AC mains 5 and only to a lesser extent between the backup power sources 2 and the load bus 4. A winding of an electrical machine 8 of the respective backup power source is connected to the tap 20 of each choke coil 3, which machine has two separate windings, with it being possible for the two windings to be used alternately as motor winding and as generator winding. Alternating current is supplied to a plurality of electrical loads 6 via the load bus 4. In the normal case, this takes place through the AC mains 5 when switches 7 between the choke coils 3 and the AC mains 5 are closed. In the process, the electrical machines 8 of the backup power sources 2 run parallel off load in order to improve the current quality on the load bus 4. A converter 10, which is connected to a generator 11 whose rotor is coupled to a flywheel 12, is connected to the respective other winding of the electrical machines 8. During mains supply, current can flow from the electrical machine 8 via the converter 10 to the generator 11 which is then being operated as a motor, in order to bring the flywheel 12 up to speed, i.e. in order to store kinetic energy in the flywheel 12. If the AC mains 5 fails, current flows in the opposite direction from the generators 11 driven by the flywheels 12 via the converters 10 to the electrical machines 8, which then supply the load bus 4. In order that in the process no voltage loss occurs towards the AC mains as long as the switches 7 are still not open, the choke coils 3 are provided between the backup power sources 2 and the AC mains 5. If all of the switches 7 are open, it is of interest for all of the parallel-connected backup power sources 2 to emit power uniformly to the load bus 4 in order for, for example, the kinetic energy stored in all of the flywheels 12 to be utilized uniformly. For this purpose, frequency measuring devices 13 are provided which measure the frequency $f_I$ of the alternating current on the load bus 4. This frequency $f_I$ is compared as an actual value with a desired value for the frequency $F_S$, which is determined in the respective module 20 from the present power of the respective backup power source 2 and a falling characteristic (see FIG. 3), by a controller 14, which is split into independent modules 16 in the individual backup power sources 2. A negative control difference occurring in the process attempts to compensate for the respective backup power source by means of a higher power, and vice versa. Thus, the power of each backup power source 2 is matched to the required power indicated by the frequency $f_I$ of the alternating current on the load bus 4 until, in the case of identical backup power sources 2, all of the backup power sources 2 produce an identical power. This control operation permits a change in the frequency $f_I$ of the alternating-current on the load bus 4 both as a consequence of changed powers of the backup power sources 2 in total and as a consequence of a different power requirement of the loads 6, for example as a result of the connection or disconnection of individual loads 6. Moreover, this control operation without any modifications is also suitable for the power of one or more standby power supply units 17 which are additionally connected to the load bus 4, of which one is sketched in FIG. 1 in the form of a diesel motor 19 connected to an AC generator 18.

If, once the AC mains 5 has been restored, the switches 7 are closed successively in order to transfer the supply of electrical power to the load bus 4 stepwise to the AC mains 5 again, or if only one branch of an AC mains 5 which is split upstream of the backup power sources 2 has failed and only the backup power sources 2 which are connected to this branch, i.e. those which are affected by this failure, have been disconnected from the AC mains 5 by their switches 7 opening, the frequency of the AC mains is imposed on the alternating current on the load bus 4, with the result that the abovedescribed option of matching the powers of the individual backup power sources 2 and of the standby power supply unit 17 to one another is no longer provided. Then, the modules 16 of the controller 14 in the individual backup power sources 2 use a phase angle $\Delta\phi$ which is determined by phase angle measuring devices 15 between the AC mains 5 and the load bus 4 in order to adjust the power of the individual backup power sources 2, with identical powers for all of the backup power sources being produced as a result of the uniform phase angle $\Delta\phi$. The phase angle $\Delta\phi$ across the choke coils 3 is a measure of the electrical power which is transmitted via each choke coil 3 from the AC mains 5 to the load bus 4. Each module 16 of the controller 14 in each backup power source 2 whose switch 7 has not yet been reconnected to the AC mains 5 can detect the phase angle $\Delta\phi$ independently of the other modules 16 and instruct the backup power source 2 to provide the power corresponding to precisely this phase angle $\Delta\phi$ to the load bus 4. Then, the electrical power required by the load bus 4 is provided in equal amounts from the backup power sources 2 which have not yet been reconnected to the AC mains 5 and via the choke coils 3 which have already been reconnected to the AC mains 5 via the closed switches 7. This control operation permits a change in the phase angle $\Delta\phi$ both as a consequence of altered powers of the backup power sources 2 which have not yet been reconnected to the AC mains and as a consequence of a different power requirement of the loads 6, for example as a result of individual loads 6 being connected or disconnected. Moreover, this control operation is likewise suitable without any changes for the power of one or more standby power supply units 17 which are connected to the load bus 4 as well.

FIG. 2 schematically reproduces the control curve which is used for controlling the power P in the individual backup power sources 2 as a function of the phase angle $\Delta\phi$. The greater the phase angle $\Delta\phi$, the more power needs to be provided by the individual backup power sources. In the simplest case, the control curve shown in FIG. 2 is defined by a proportionality factor between $\Delta\phi$ and P.

In contrast, for the period in which all of the switches 7 shown in FIG. 1 are open, the falling characteristic illustrated in FIG. 3 is used. As a function of the present power of the respective backup power source 2, a frequency $f_S$ is determined as the desired value for the comparison with the measured frequency $f_I$ of the alternating current on the load bus 4.

Many variations and modifications can be made in the preferred embodiments of the invention without deviating from the essence and the principles of the invention. All of these modifications and variations are envisaged as being included in the scope of the present application as it is defined by the following patent claims.

LIST OF REFERENCE SYMBOLS 1 apparatus
2 backup power source
3 choke coil
4 load bus
5 AC mains
6 load
7 switch
8 electrical machine
10 inverter
11 generator
12 flywheel
13 frequency measuring device
14 controller
15 phase angle measuring device
16 module
17 standby power supply unit
18 AC generator
19 diesel motor
20 tap

We claim:

1. A method of controlling a plurality of parallel-connected UPS units of a UPS system, each of the UPS units being connected on the input side via a choke coil to an AC mains, in disconnectable fashion, and on the output side to a common load bus, and the power supplied by each individual UPS unit being variable, the method comprising the steps of:
   in the event of a failure of the AC mains: disconnecting at least the UPS units affected by the failure from the AC mains;
   after the restoration of the AC mains: successively reconnecting the UPS units to the AC mains;
   and while a first group of the UPS units is connected on the input side to the AC mains and a second group of the UPS units is not connected on the input side to the AC mains: determining a phase angle $\Delta\phi$ between an alternating current of the AC mains and an alternating current on the load bus and adjusting the power supplied by each of the UPS units in the second group as a function of the phase angle $\Delta\phi$ in order to match the powers supplied by the individual UPS units in the second group to one another.

2. The method according to claim 1, wherein the powers supplied by the UPS units in the second group are adjusted independently of other ones of the UPS units as a function of the phase angle $\Delta\phi$.

3. The method according to claim 2, wherein the phase angle $\Delta\phi$ between the alternating current of the AC mains and the alternating current on the load bus is determined separately for each UPS unit in the second group.

4. The method according to claim 1, wherein the powers supplied by the UPS units in the second group are adjusted proportionally with respect to the phase angle $\Delta\phi$.

5. The method according to claim 1, wherein the phase angle $\Delta\phi$ between the alternating current of the AC mains and the alternating current on the load bus is also used during the successive reconnection of the UPS units to the AC mains in order to adjust the power supplied by at least one standby power supply unit which is connected to the load bus.

6. An online UPS system having a plurality of parallel-connected UPS units, the UPS units each being connected on the input side via a choke coil to an AC mains, in disconnectable fashion, and on the output side to a common load bus, and the power supplied by each individual UPS unit being variable, and a controller, which comprises at least one device for determining a phase angle $\Delta\phi$ between an alternating current of the AC mains and an alternating current on the load bus and which in the event of a failure of the AC mains, disconnects at least the UPS units affected by the failure from the AC mains; after the restoration of the AC mains, successively reconnects the UPS units to the AC mains; and while a first group of the UPS units is connected on the input side to the AC mains and a second group of the UPS units is not connected on the input side to the AC mains, adjusts the power supplied by each of the UPS units in the second group as a function of the phase angle $\Delta\phi$ in order to match the powers supplied by the individual UPS units in the second group to one another.

7. The online UPS system according to claim 6, wherein the controller for each UPS unit has a module, which adjusts the powers supplied by the UPS units in the second group independently of the modules of other ones of the UPS units as a function of the phase angle $\Delta\phi$.

8. The online UPS system according to claim 7, wherein each module has a dedicated device for determining the phase angle between the alternating current of the AC mains and the alternating current on the load bus.

9. The online UPS system according to claim 7, wherein a control curve for the power of the associated UPS unit, which is proportionally dependent on the phase angle, is stored in each module.

10. The online UPS system according to claim 7, wherein the modules adjust the powers supplied by the UPS units in all operating states of the apparatus independently of one another.

11. The online UPS system according to claim 6, wherein the UPS units are designed to be identical.

12. The online UPS system according to claim 6, wherein at least one standby power supply unit, which is connected to the load bus, is additionally provided, and the controller also adjusts the power supplied by the standby power supply unit as a function of the phase angle $\Delta\phi$ while successively reconnecting the UPS units to the AC mains.

* * * * *